July 30, 1968 W. O. REINITZ ET AL 3,394,498
TRAFFIC CONTROL DEVICES
Filed Feb. 25, 1966 6 Sheets-Sheet 1

INVENTORS.
Willard O. Reinitz
Harry A. Scott
BY
Robert H. Ware
ATTORNEY

Fig. 14. POWER UP

Fig. 15. POWER DOWN

United States Patent Office 3,394,498
Patented July 30, 1968

3,394,498
TRAFFIC CONTROL DEVICES
Willard O. Reinitz, Minneapolis, Minn., and Harry A. Scott, Oradell, N.J., assignors to Railroad Accessories Corporation, Cresskill, N.J.
Filed Feb. 25, 1966, Ser. No. 530,182
10 Claims. (Cl. 49—141)

ABSTRACT OF THE DISCLOSURE

A lightweight grade-crossing gate and actuator mechanism. A hollow arm is secured by a break-away connector to a gate supporting means which is selectively raised or lowered. The break-away connector includes a post depending from the gate supporting means and telescopically received in a socket attached to the arm. Shear pins normally maintain the arm in the plane in which the gate supporting means pivots. Cooperating means are provided for preventing telescopic disengagement of the socket from the post until the arm is pivoted out of the plane by a predetermined amount. The actuator mechanism is adapted for ready removal as a unit and for smooth operation over its stroke.

---

This invention relates to traffic control devices, and particularly to lightweight lift gates and improved actuating mechanisms for use at railway grade crossings and other traffic control points.

Traffic control gates must provide a visible barrier, effective to block traffic in a closed position, which may be raised conveniently to an open position offering no obstruction to the flow of traffic. Such gates generally extend at least halfway across a roadway, to present this visible barrier in the path at all approaching traffic. They are customarily supported cantilever-fashion at the roadside, and these elongated crossing gates must be stiff and rigid in order to extend effectively across all traffic lanes to be obstructed by the gate.

Conventional crossing gates have been formed of sturdy, heavy wood or metal construction, requiring heavy-duty lifting mechanisms at the roadside and large counterweights to counterbalance the weight of the heavy crossing gate. These heavy conventional crossing gates have been expensive to manufacture and difficult to repair when damaged by collision. Numerous railroad grade crossings are therefore unprotected by crossing gates, resulting in many avoidable accidents.

It has been discovered that these and other disadvantages of the prior art constructions can be avoided by the lightweight construction of the present invention, which incorporates novel means for minimizing damage to the actuating mechanism from vehicle collisions with the gate arm. The gate arm, preferably of lightweight construction, is attached to the actuating mechanism through a post-and-socket joint incorporating a break-away feature. The actuating mechanism is adapted for simple installation and maintenance, and for efficient and reliable operation.

Accordingly, a principal object of this invention is to provide a lightweight, economical traffic control gate.

Another object of the invention is to provide traffic control gates with dependable and economical actuating mechanisms, which may be conveniently removed and replaced for maintenance or repair.

Another object of the invention is to provide traffic control gates with self-contained hydraulic actuating mechanisms affording unexpectedly effective actuation coupled with fail-safe operating advantages.

Another object of this invention is to provide traffic control gates and actuating mechanisms which can be readily mounted to mast supports of existing grade crossing signals without extensive and costly rehabilitation or replacement of such existing signals.

A further object of the invention is to provide such crossing gates with a break-away detachable connection between the gate and the actuating mechanism, minimizing damage from vehicle collisions and facilitating removal and replacement of gate arms.

Other and more specific objects will be apparent from the features, elements, combinations and operating procedures disclosed in the following detailed description and shown in the drawings, in which:

Figures 1, 2, 3, 4:
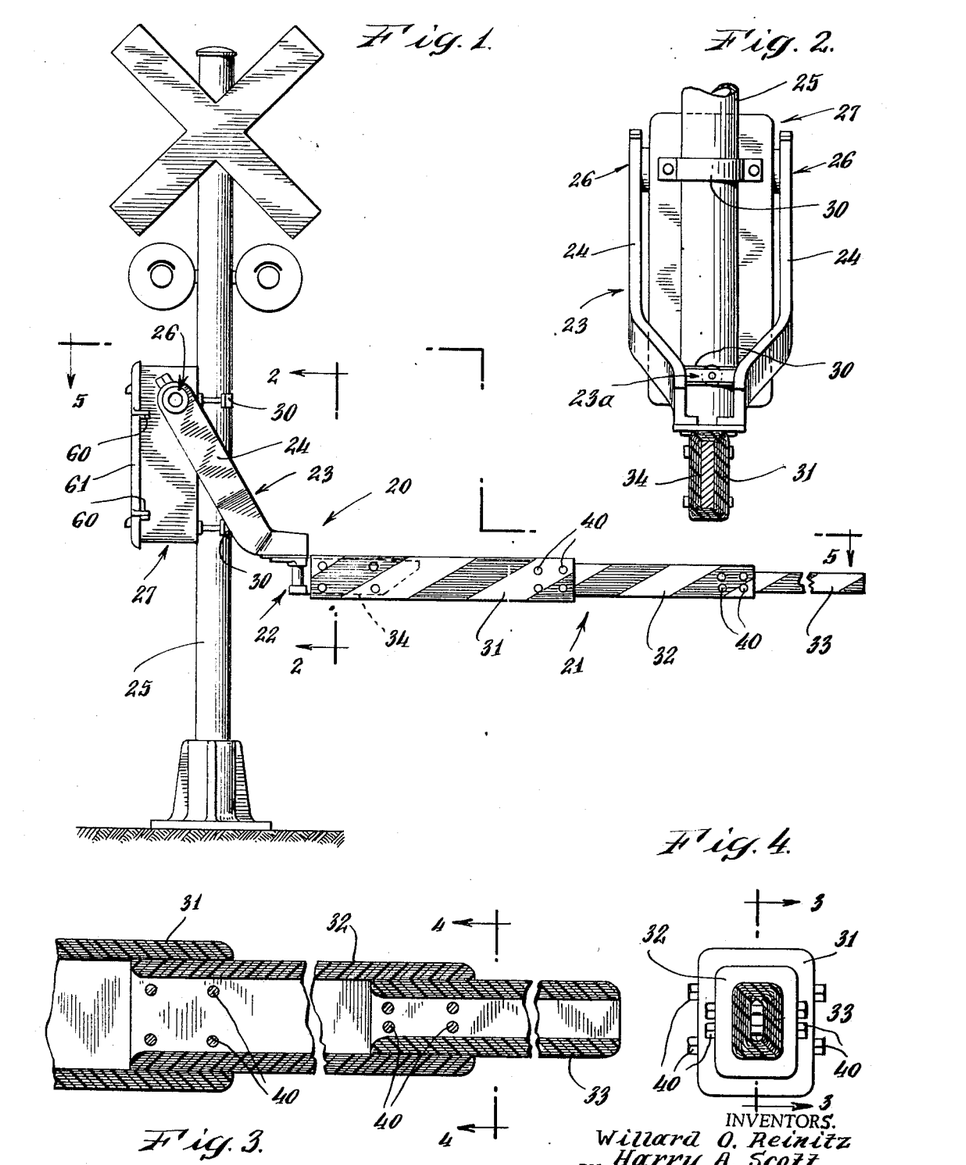
FIGURE 1 is a side elevation view of a crossing gate incorporating features and advantages of the present invention and shown mounted in its operating position on the pole of a railroad grade crossing signal.
FIGURE 2 is an enlarged, fragmentary front elevation view, partially in section, showing the crossing gate of FIGURE 1.
FIGURE 3 is a further-enlarged fragmentary cross-sectional side elevation view showing the construction of the lightweight crossing gate arm, taken taken along the line 3—3 in FIGURE 4.
FIGURE 4 is a fragmentary sectional end elevation view of the crossing gate arm in FIGURE 3, taken along the line 4—4 in FIGURE 3.

The various component sub-assemblies of a traffic control or crossing gate incorporating the present invention are shown in FIGURE 1. The gate assembly 20 includes a lightweight gate arm 21 joined by a break-away connector 22 to a forked yoke 23 having arms 24 embracing a pole 25 with their opposite ends firmly anchored to a shaft 26 passing through an actuator housing 27 which is itself clamped to the pole 25. Inside housing 27, an actuator mechanism 28 (FIGURES 9–11) including a self-contained, pivotally mounted hydraulic assembly 29 (FIGURES 12–15) is connected to move the yoke 23 from its lowered position (FIGURES 1 and 10) to its raised position (shown in FIGURE 13 and in dashed lines in FIGURE 10), by producing controlled pivotal rotation of shaft 26 upon command. The lightweight crossing gate arm is shown in detail in FIGURES 2, 3 and 4; the break-away connector is 22 shown in detail in FIGURES 6, 7 and 8.

Lightweight gate arm

The lightweight traffic control gate arm 21 of the present invention is advantageously made of telescoping, laminated resin segments having a generally rectangular, tubular cross-section. Several progressively smaller telescoped segments are preferred for ease of fabrication and sturdy, stiff construction. These gate arms 21 thus resemble in some respects tubular laminated "fiberglass" fishing rods, and they couple light weight with resilient flexibility and excellent weather-proof qualities. Thus, as shown in FIGURES 3 and 4, the gate arm 21 may be formed of successively telescoped sections such as a base section 31, an intermediate section 32, and an end section 33 for convenience and economy of fabrication, shipping and installation. Each of the sections 31, 32 and 33 is generally rectangular in cross-section, preferably being formed on a removable mandrel leaving a generally rectangular central bore into which the next succeeding section is telescopingly inserted and firmly bonded in place by cement or cured resin, or preferably detachably joined by removable bolts 40, as shown in FIGURES 1, 3 and 4, to facilitate shipping, handling and field replacement. Each of the sections 31, 32 and 33 is preferably formed of laminated resin layers such as polyester or epoxy resin, laid over successive layers of woven fiberglass cloth and cured by heat or catalysts to form the monolithic laminated sections shown in the figures, using well-known resin-laminating techniques. The free end of end section 33 may be provided with a plug bonded in place with a compatible resin if desired, and a fixed or flashing signal light may be mounted in or suspended from one or more of the telescoped sections, with its electrical wiring being enclosed within the communicating hollow bores of the successive telescoped sections 31–33, which form a high-dielectric insulating conduit for such wiring. The free end of the hollow bore of base section 31 accommodates an anchor plate 34 forming part of break-away connector 22 and bolted securely inside the gate's base section 31, as shown in FIGURES 1, 6 and 8.

Break-away connector

Figure 8:
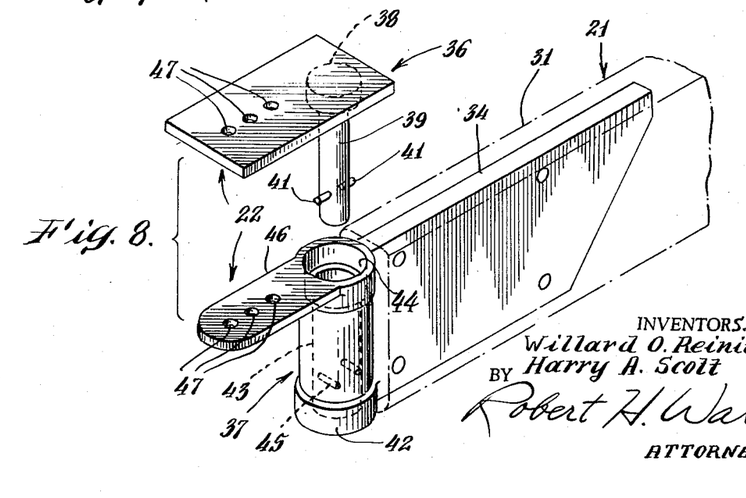
FIGURE 8 is an exploded perspective view of the break-away connection components shown in FIGURES 6 and 7.

The break-away connector 22 incorporates two inter-fitting members shown disengaged in the exploded view of FIGURE 8: a yoke plate 36 and a gate socket 37.

Figure 6:
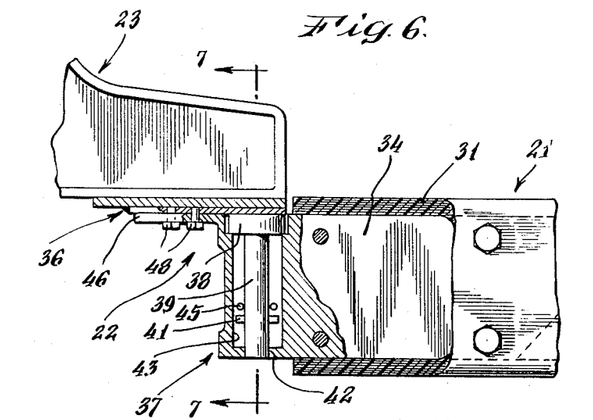
FIGURE 6 is a fragmentary side elevation view, partially in section, showing the break-away connection between the crossing gate and its actuating mechanism.
Figure 7:
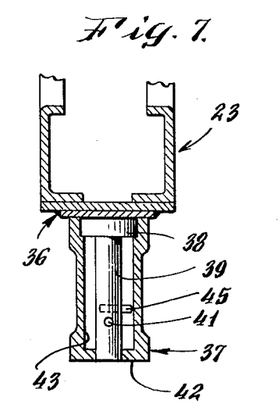
FIGURE 7 is a cross-sectional front elevation view of the break-away connection of FIGURE 6.

The yoke plate 36 is integrally secured, by welding for example, beneath the gate end of yoke 23, as shown in FIGURES 6 and 7. Gate arm 23 and yoke plate 36 may be made of aluminum or steel castings. Extending downward from the yoke plate 36 is a short cylindrical pivotal hub 38 forming a base for a concentric, elongated cylindrical connector post 39 smaller in diameter than hub 38 and having two diametrically opposite protruding radial ears 41.

Gate socket 37 includes a cylindrical casing 42 having a central socket bore 43 with an internal diameter larger than the overall diametric dimension of the ears 41, but smaller than the diameter of the hub 38, communicating with an enlarged portal bore 44 at its upper end dimensioned to receive and pivot upon the hub 38 when post 39 and socket bore 43 are telescopingly engaged, as shown in FIGURE 6.

One or two ledges or ledge rods 45 extend chordally across the socket bore 43 just above the position of the radial ears 41 in the telescopingly engaged position of post 39 and socket bore 43 as shown in FIGURE 6. The ledge rods 45 are non-diametric, and extend across chordal segments of a selected cross-section of the socket bore 43, with the chord segments being transverse to the principal axis of ears 41. The anchor plate 34 is integrally joined along a radial plane to socket casing 42, as shown in the figures, and gate arm 21 is bolted to plate 34.

The ledge rods 45 are spaced radially from the central axis of socket bore 43 to clear connector post 39 while interfering with radial ears 41 when socket casing 42 and post 39 are aligned for engagement, as shown in the figures. Thus, gate 21 must be pivoted about hub 38 so that the relative angular positions of socket bore 43 and connector post 39 are selected during the telescoping engagement of these parts to allow the ears 41 to pass between the rods 45, as indicated in the FIGURES 6–8.

A tongue 46 extends radially from the portal bore end of socket casing 42, aligned for closely underlying juxtaposition beneath yoke plate 36 under the end of yoke 23. Both yoke plate 36 and tongue 46 are provided with one or more shear-bolt apertures 47 as shown in FIGURES 6 and 8. Shear bolts 48 of shearable material such as steel or bronze of appropriate section are bolted through apertures 47 in plate 36 and tongue 46 to anchor gate socket 37 firmly to yoke plate 36, thus securing gate arm 21 to yoke 23 as shown in FIGURE 6. During the telescoping assembly of gate socket 37 over connector post 39, the ledge rods 45 serve to rest upon radial ears 41 and to support gate arm 21 during the installation of shear bolts 48.

Figure 5:
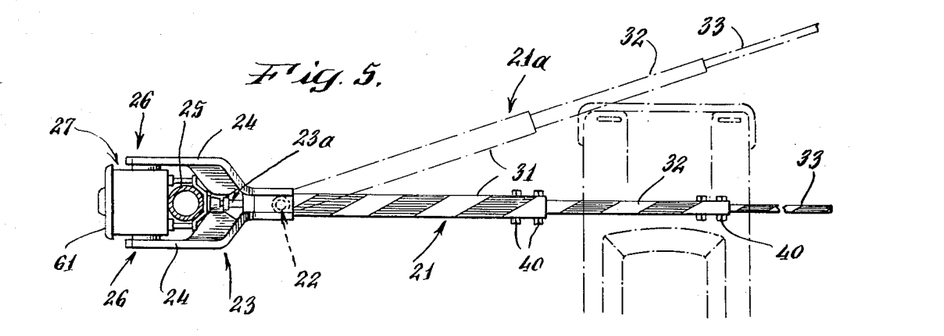
FIGURE 5 is a top plan view of the crossing gate of FIGURE 1 showing the effect thereon of a vehicle collision.

This break-away connector 22 operates to minimize damage to gate arm 21 and to avoid twisting distortion or misalignment of the actuating mechanism 28 enclosed in the housing 27. As indicated in FIGURE 5, a collision of a passing vehicle with gate arm 21 causes initial pivoting motion of the gate arm 21 about hub 38, with portal bore 44 of gate socket 37 being journaled on hub 38. This pivoting motion of gate arm 21 and gate socket 37 about hub 38 quickly shears the shear bolts 48, allowing the gate socket 37 to drop away from yoke plate 36 until ledge rods 45 rest upon ears 41. If the pivoting motion of gate arm 21 about post 39 continues over a sufficient arc, ledge rods 45 will thereby be rotated far enough to clear ears 41, allowing the assembly of gate arm 21 and gate socket 37 to drop away from the connector post 39 of yoke plate 36. To facilitate this drop-away operation, hub 38 or post 39 or socket bore 43 may all be tapered to avoid wedging or jamming. Since angular pivoting motion of gate arm 21 at the urging of the colliding vehicle is not transmitted through the break-away connector 22, no twisting or distortion of the yoke 23 results, and actuating mechanism 28 is not harmed by such collisions. The lightweight laminated resin gate arm 21 minimizes damage to such a colliding vehicle, and if arm 21 should be thrown across a nearby railroad track it is easily crushed by the first passing train, causing no danger of derailment.

If gate arm 21 is undamaged by such a collision, it may be re-installed on yoke 23 through the use of new shear bolts 48, and a new gate arm 21 may be easily substituted for a damaged gate arm in the same manner.

Actuator mechanism

Figure 9:
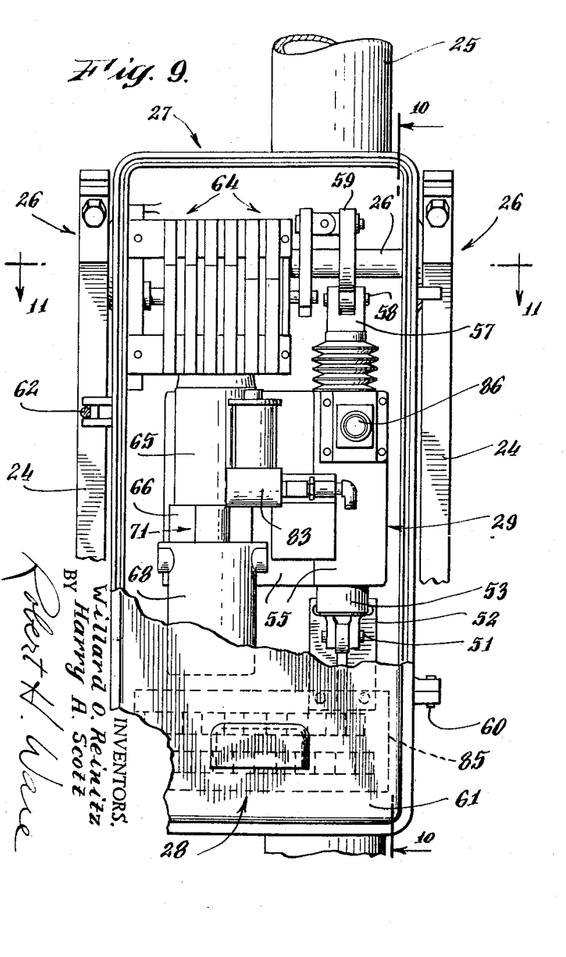
FIGURE 9 is a fragmentary rear elevation view, partially broken away, showing the actuating mechanism of the crossing gate of this invention.
Figure 10:
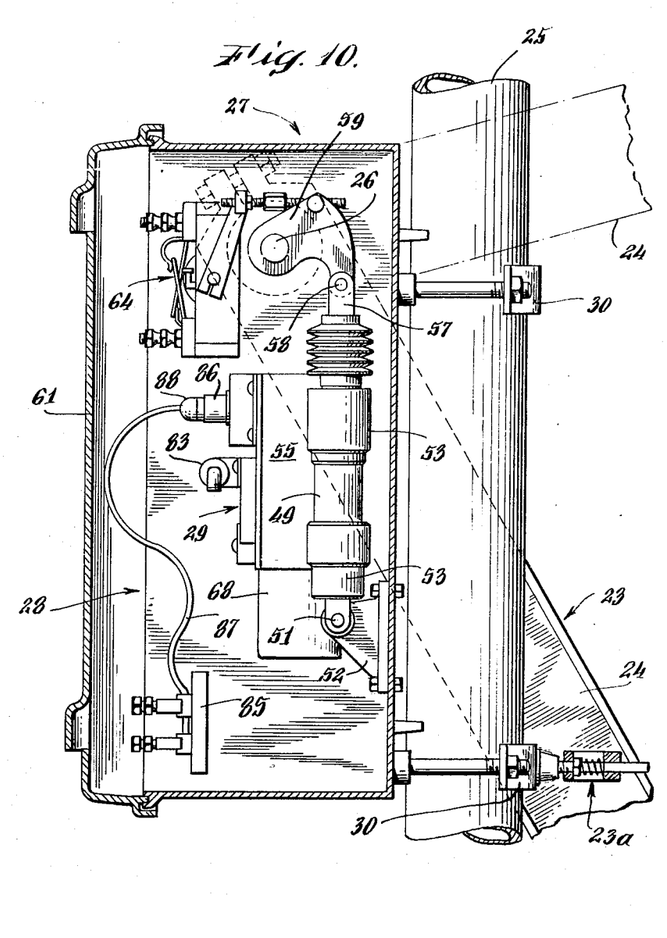
FIGURE 10 is a cross-sectional side elevation view of the actuating mechanism of FIGURE 9 in the lowered position of the gate arm.
Figure 11:
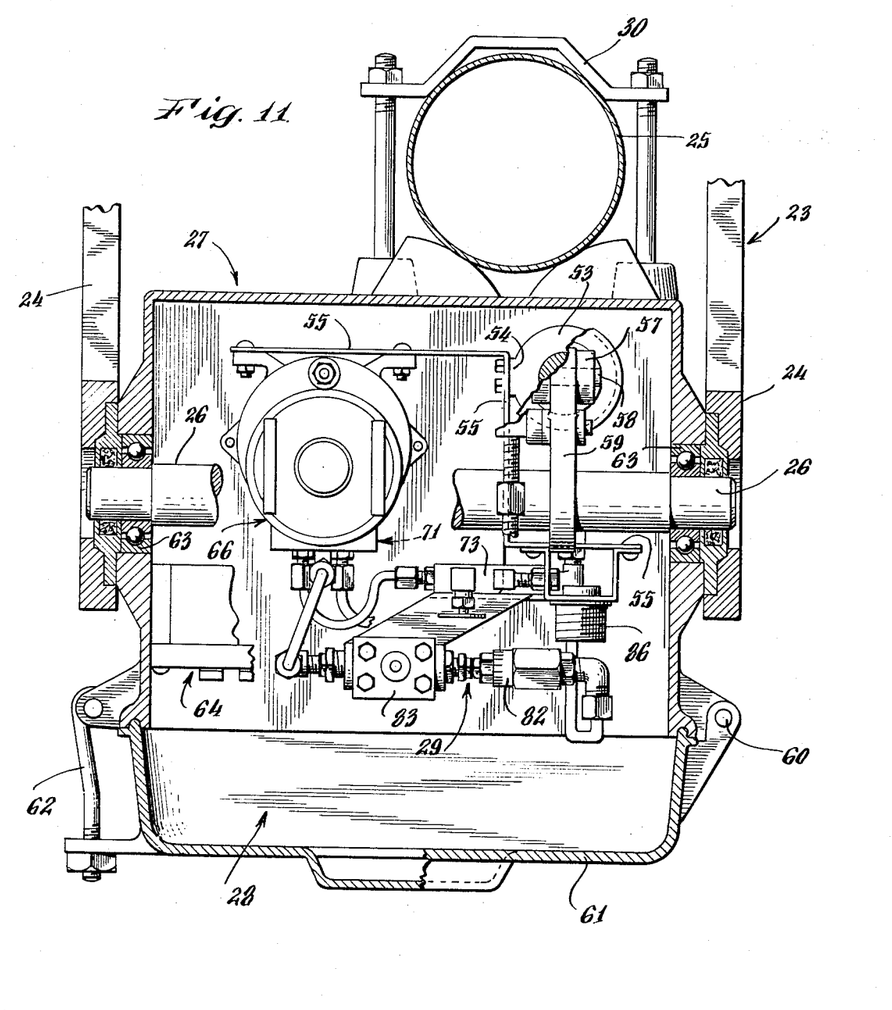
FIGURE 11 is an enlarged cross-sectional top plan view, partially broken away, showing the actuating mechanism of FIGURES 9 and 10.

As shown in FIGURES 9–11, the preferred actuator mechanism 28 is enclosed in the actuator housing 27 and incorporates a self-contained hydraulic assembly 29 with a hydraulic cylinder 49 having its lower end pivotally anchored by a removable pivot pin 51 to a base flange 52 secured as by bolts to an inside wall of housing 27, as shown in FIGURES 9 and 10. Cylinder 49 is provided with mounting collars 53 each having a laterally extending mounting boss 54 (FIGURE 11) fitting the central portion of a Z-shaped actuator plate 55 forming the movable "chassis" for the entire self-contained hydraulic assembly 29, which is thus free to move pivotally about pivot pin 51.

Secured within hydraulic cylinder 49 between cushion-buffing end chambers is an axially-movable piston 56 (FIGURES 14 and 15), whose piston rod 57 is pivotally anchored by a removable pin 58 to a crank arm 59 keyed or splined to the actuator shaft 26. Extension of the hydraulic piston-cylinder assembly 49–56–57 thus pivots crank arm 59 and shaft 26 about the axis of shaft 26 to raise yoke 23 from its solid line position to its dash line position as indicated in FIGURE 10. Cylinder 49 and plate 55 are thus supported solely on pivot pins 51 and 58. The entire self-contained hydraulic assembly 29 is mounted on and secured to the actuator plate 55, and this entire assembly is removable merely by disconnecting the two removable pivot pins 51 and 58 shown in FIGURES 9 and 10, and removing electrical plug connector 88 from its plug coupling 86. The hydraulic assembly 29 may thus be removed for maintenance or repair and a new hydraulic assembly 29 may be substituted quickly and easily.

Figures 12, 13:
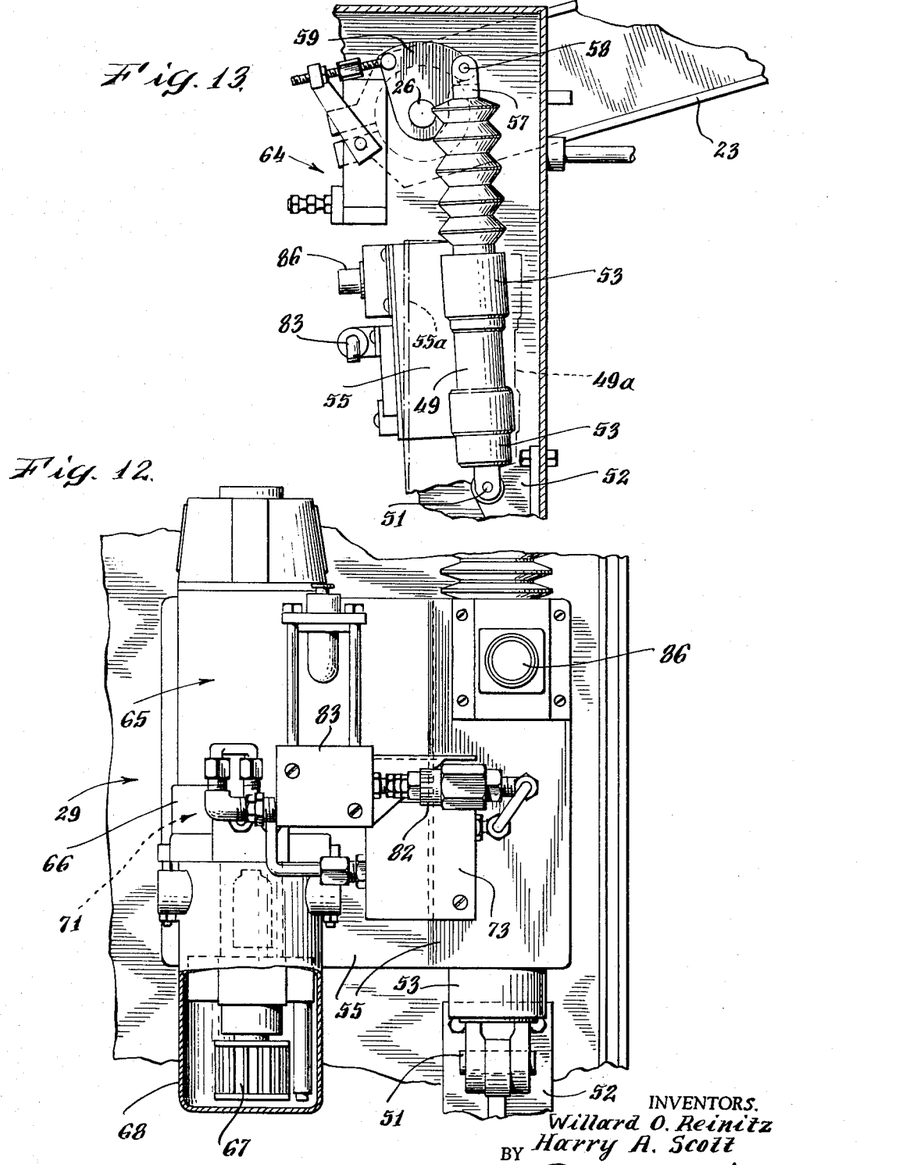
FIGURE 12 is an enlarged, fragmentary rear elevation view of the removable hydraulic actuator assembly in the mechanism shown in FIGURES 9–11.
FIGURE 13 is a fragmentary cross-sectional side elevation view, contrasting with FIGURE 10 and showing the actuating mechanism in the raised position of the crossing gate arm.

The retracted position of the piston-cylinder assembly is shown in FIGURE 10 and by dash lines 49a and 55a in FIGURE 13, while the extended position of the assembly, pivoting about pin 51, is shown by solid lines 49 and 55 in FIGURE 13, where the crank arm 59 and yoke 23 are both shown in their uppermost positions, pivoted upward about shaft 26.

The crank arm 59 is angularly positioned on shaft 26 to equalize the actuating pressure required throughout the entire stroke of the piston in cylinder 49, and assuring maximum leverage for lifting the gate arm 21, and smooth, even operation.

As shown in FIGURE 11, the actuator housing 27 is a boxshaped casing having a hinged cover 61 secured by hinges 60 and pivoting dogs 62. Housing 27 is firmly clamped to the pole of any standard grade crossing flasher signal by clamps 30 shown in FIGURES 1, 2, 5, 10 and 11. If desired, the lower clamp 30 forms a supporting stop for yoke 23 in the lowered position of the gate arm 21 (FIGURE 1), with an adjustable, rubber bumper-tipped compression spring buffer and bracket assembly 23a being aligned spanning the yoke 23 to come to rest against lower clamp 30 in this lowered gate position. Ball or roller bearings 63 are mounted in the side walls of housing 27 to receive the protruding ends of the actuator shaft 26 extending across the housing 27. Angular movement of the crank arm 59 by hydraulic assembly 29 produces angular pivotal movement of shaft 26 in the bearings 63, causing corresponding angular pivoting movement of the arms 24 of yoke 23 to raise gate arm 21 to its retracted uppermost position, or to lower the gate arm to its traffic-blocking position shown in FIGURE 1.

Rotation of shaft 26 also actuates cam switches 64 juxtaposed with cams mounted on shaft 26 beside the crank arm 59 to perform predetermined signaling, control, override and fail-safe functions by closing the selected electrical connections at predetermined angular positions of shaft 26.

Operation of the hydraulic assembly

A self-contained hydraulic assembly 29 providing the motive force for the actuator mechanism 28 is mounted on actuator plate 55 and includes a series of interconneced components. As indicated in FIGURES 9–15, an electric motor 65 drives a pump 66 which draws oil through a filter 67 immersed in an oil reservoir 68. Both the pump 66 and filter 67 may be enclosed inside the casing of reservoir 68. In the preferred form of the invention, the motor 65 driving reversible pump 66 by a direct coupling is preferably a reversible motor.

Power up mode

Figure 14:
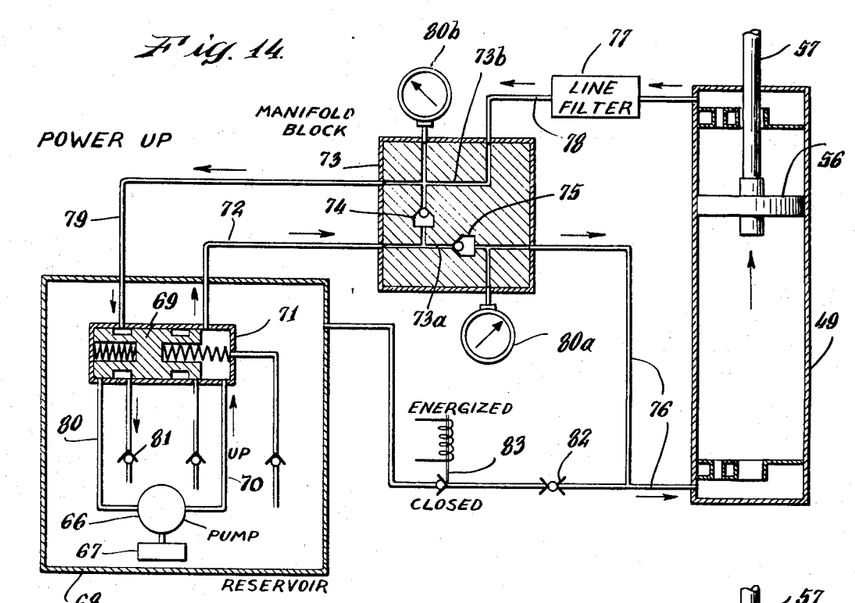
FIGURES 14 and 15 are schematic diagrams of the self-contained hydraulic system of the removable actuator assembly shown in FIGURE 12.
Figure 15:
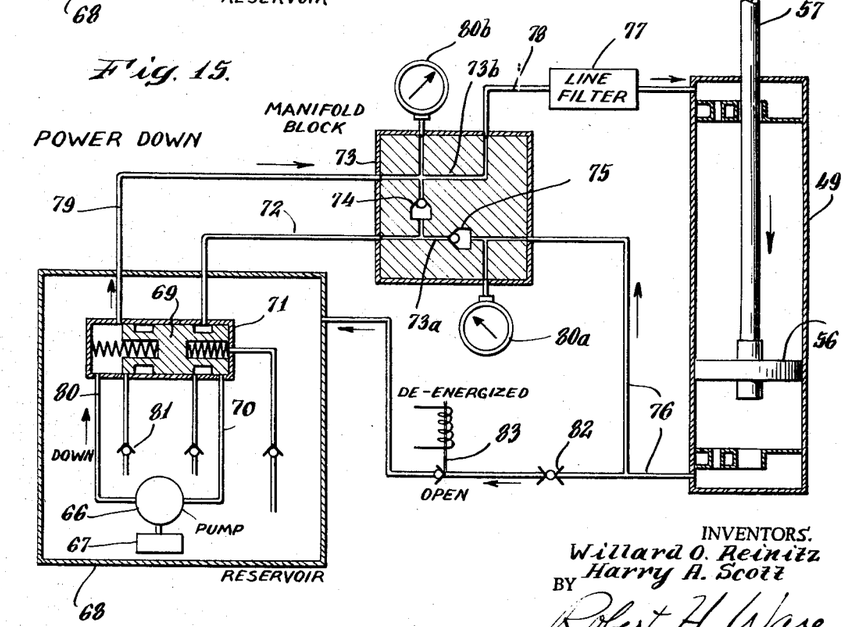

The two alternate modes of operation of the hydraulic assembly 29, respectively shown in FIGURES 14 and 15, are selected by reversing the direction of motor 65–pump 66, thereby switching the hydraulic fluid flow to cylinder 49 by means of a selector valve 71 installed in the casing of pump 66. In the Power Up mode of FIGURE 14, the central movable valve element 69 in the selector valve 71 is shown shifted to its left position, because the reversible pump 66 is supplying its output pressure through its right-hand output conduit 70 to the right-hand end of the valve 71. There the hydraulic fluid bypasses the valve element 69 and passes into the upper conduit 72 connected to a manifold block 73. As shown in FIGURES 14 and 15, block 73 is provided with a first passage 73a normally connecting conduit 72 to the lower end of cylinder 49 via a check valve 75 and a lower supply conduit 76. Return fluid flow is directed from the upper end of cylinder 49 through a line filter 77, and an upper supply conduit 78 connected via a second passage 73b in manifold block 73 to a down conduit 79 leading to the opposite end of selector valve 71. Hydraulic pressures may be shown if desired by a first pressure gage 80a connected to first passage 73a, and a second pressure gage 80b connected to second passage 73b. A cross-check valve 74 leading from the second passage to the first passage is set to open only when pressure in the second passage 73b shown on gage 80b, exceeds pressure in the first passage 73a, shown on gage 80a by a substantial amount, 200 p.s.i.g. for example.

Pump output pressure in first passage 73a keeps crosscheck valve 74 closed, and it also forces open the upcheck valve 75, thereby supplying pressure to the lower cylinder supply conduit 76, thus supplying pressure to the underside of piston 56 in cylinder 49 to raise piston rod 57 and produce upward motion of the gate arm 21.

Hydraulic fluid above piston 56 returns during the upward stroke of the piston in cylinder 49 through the line filter 77 interposed in the upper cylinder supply conduit 78 leading to manifold block 73, where the returning hydraulic fluid bypasses cross-check 74 because its pressure is not sufficient to open this valve. Returning by down conduit 79, this hydraulic fluid bypasses the valve element 69 through an annular cavity therein and returns through a check valve 81 into reservoir 68.

Gate raised position

The gate arm 21 is normally maintained in its uppermost position by check valves 75 and 83 which normally block return flow of hydraulic fluid through lower supply conduit 76, whether or not pump 66 is operating.

Power down mode

The Power Down mode shown in FIGURE 15 is initiated, as by railroad track circuit relays, only when gate arm 21 must be lowered to block approaching traffic. Upon command, supply switches for motor 65 are closed, and the reversible pump 66 supplies output pressure through its left output conduit 80 to the left end of selector valve 71, automatically shifting its valve element 69 fully to the right and thus admitting pressure to down conduit 79. Normal pump output pressure is insufficient to open cross-check valve 74 in manifold block 73, and the pump output pressure from down conduit 79 thus passes through second passage 73b and line filter 77 in upper cylinder supply conduit 78 into the upper end of cylinder 49, applying pressure to the upper side of piston 56 to drive the piston down the cylinder and thus lower gate arm 21 with positive downward driving action.

Hydraulic fluid in the lower end of cylinder 49 beneath piston 56 cannot pass through lower cylinder supply conduit 76 into manifold block 73 where it is blocked by check valve 75, and it therefore can pass only through the adjustable flow control valve 82 which is preadjusted to throttle the flow of hydraulic fluid to control the rate of downward descent of piston 56 and arm 21. From valve 82 the hydraulic fluid returns through solenoid valve 83; in this Power Down mode, the solenoid is de-energized and valve 83 is open, allowing free return of hydraulic fluid through valve 83 into reservoir 68.

Gravity descent of the gate

The Power Down mode may be desirable in some cases to assure positive initiation of the downward traverse of the gate, from the 90° position down to the 85° position of the gate arm, for example. After downward movement is initiated, the Power Down mode with pump 66 supplying positive pressure to down conduit 79 may be terminated and normal free-fall, gravity descent of gate 21 brings the gate to its desired blocking position shown in FIGURE 1, with the rate of descent controlled by adjustment of the adjustable flow control valve 82. While the Power Down mode may be desirable in some cases, for example when a very short length of gate arm only is required, it is a designed feature of this device that sufficient downward torque is provided by gate arm 21 of typical length and yoke assembly 23 to counteract the force of gravity so that when required the gate arm will fall to horizontal position without the necessity of utilizing power operation for the first few degrees of downward movement.

*Fail-safe operation*

In the Power Up mode shown in FIGURE 14 and also in the gate raised position, the solenoid valve 83 is closed to block any flow of hydraulic fluid from conduit 76 through valves 82 and 83. The solenoid valve 83 thus provides an advantageous fail-safe feature to the traffic control gates of the present invention, since the solenoid *must* be energized in order to raise the gate 21 in the Power Up mode of FIGURE 14, or to allow gate 21 to remain in its raised position. Power failure automatically opens valve 83, permitting gate 21 to descend by gravity, driving hydraulic fluid ahead of descending piston 56 through valves 82 and 83 into reservoir 68, and thus placing the gate 21 in its lowered position blocking approaching traffic.

A further advantage of the de-energized solenoid valve 83 supplying an open return conduit during descent of the gate arm 21 is realized when an obstruction is present in the path of the descending gate arm, such as a tall vehicle on the roadway. The arm 21 descends until it reaches the obstruction, and the continued operation of the pump 66 supplying pressure through conduits 78 and 79 to the upper side of piston 56 merely raises the pressure in these conduits until it is sufficient to open crosscheck valve 74, permitting return flow through upper conduit 72, and another annular chamber in valve element 69, directly to the reservoir 68, with an alternate bypass return path being provided by check valve 75, lower cylinder supply conduit 76, and valves 82 and 83. When the obstruction is removed, arm 21 and piston 56 are free to continue their descent.

When a power failure has de-energized the solenoid of valve 83 and the gate arm 21 has dropped to its blocking position, it may be raised manually by firm upward pressure on the gate arm 21, for the two check valves 74 and 75 allow direct bypass flow of hydraulic fluid from the upper end into the lower end of cylinder 49 as piston 56 travels upward in the cylinder.

An open line in the hydraulic assembly 29 producing leakage of hydraulic fluid will have the same effect as a power failure, since the normal fail-safe position of the gate arm 21 is its lowermost blocking position shown in FIGURE 1.

A current-limiting resistor may be placed in series with the coil of the solenoid of valve 83 to reduce the current drain of the solenoid at all times when the gate arm is standing at its 90° or uppermost, raised position, or within one or two degrees of that position, where the gate 21 will normally stand during all normal traffic flow conditions. An automatic bypass may shunt this current-limiting resistor during the Power Up traverse of the gate arm from its blocking lower position or "0-degree" position, up to two degrees of its uppermost position for example, thus assuring ample driving power throughout the Power Up mode of the device, with ample holding-current through the solenoid to assure that return valve 83 will be held closed.

The connector wiring for motor 65 and for solenoid valve 83 is brought into the housing 27 to a terminal board 85 in the lower portion of the housing, and hence by means of a flexible harness 87 to a plug connector 88 (FIGURE 10) engaged in a plug coupling 86 mounted facing the hinged cover 61 on the front of housing 27 and protruding from the actuator plate 55.

The cam switches 64 in the upper portion of housing 27 are actuated by suitable cams on the shaft 26, and may govern the switch shunting the current-limiting resistor in series with the solenoid of valve 83, as well as the automatic disconnection of the motor 65 in the Power Down mode after gate 21 has completed the first few degrees of its descent; automatic actuation of flashing signal lights and bells or "downstream" track circuit indications of the closing of gate arm 21 or power failure, or the mode or condition of the system, may also be initiated by the cam actuated switches 64.

The simplified and self-contained hydraulic assembly 29 with its power cylinder 49 coupled for direct driving of shaft 26 eliminates the conventional gear trains, driving cams and follower linkages and control relays customarily used to raise heavy counter-weighted wooden or metal gate arms in conventional crossing gates. The devices of the present invention are therefore unusually economical and easy to fabricate and to maintain, and new gate arms 21, connectors 22 or hydraulic assemblies 29 may be installed quickly by maintenance personnel either for routine maintenance or for repair of faulty units whenever required.

Crossing gates having pivoting or spring-based arms have been suggested in United States Patents 1,356,302, 1,628,651 and 1,667,537, and shear-pin connectors appear in Patent 1,356,302 and in British Patent 917,486. The crossing gates of this invention are far superior to these devices, for the shearable bolts 48 co-operate with the pivoting, disengageable assembly of yoke plate 36 and socket 37 to hold the gate rigidly in its designed position, but to release it and drop it freely, without risk of backlash damage to vehicles or pedestrians, when any deflection load exceeds the predetermined shear limit of the bolts 48.

While the objects of the invention are efficiently achieved by the preferred forms of the invention described in the foregoing specification, the invention also includes changes and variations falling within and between the definitions of the following claims.

We claim:
1. A traffic control device positioned beside the path of approaching traffic and comprising in combination
   (A) a rotatably-mounted shaft having its axis substantially parallel to the traffic path,
   (B) gate-supporting means anchored to the shaft to rotate therewith in a plane transverse to the shaft's axis and the traffic path,
   (C) an elongated traffic-blocking gate arm extending in said plane,
   (D) a connector securing said gate arm to said gate-supporting means, said connector including releasably engaging means for releasing said gate arm from said gate-supporting means when said gate arm is deflected out of said plane by a predetermined amount,
   (E) and an actuating mechanism connected to move the gate-supporting means pivotally about the shaft's axis to position the gate arm in one of two limiting positions in said plane and to move the gate arm to either of these positions upon command.

2. The traffic control device defined in claim 1, wherein said releasably engaging means comprises:
   (A) a first member attached to said gate-supporting means and having a free lower end,
   (B) a second member attached to said arm and having a free upper end,
   (C) one of said free ends being in the form of a post telescopically received into a socket formed into said other free end, and
   (D) cooperating means on said members for preventing telescopic disengagement of said post and said socket when said gate arm is positioned in said plane while permitting telescopic disengagement of said post from said socket when said gate arm is deflected out of said plane by a predetermined angle.

3. The traffic control device defined in claim 2 wherein said releasably-engaging means further includes break-away disconnectable means securing the gate arm to the gate supporting means resisting their relative pivotal movement and having a predetermined maximum angular load limit, whereby deflecting loads tending to produce such pivotal movement and exceeding this maximum load limit automatically disconnect the break-away means.

4. The traffic control device defined in claim 1 wherein the elongated traffic-blocking gate arm is tubular with successively smaller-diameter segments having their adjacent ends rigidly joined, forming a unitary hollow gate arm having a central hollow bore extending along substantially its entire length.

5. The traffic control device defined in claim 1 wherein the elongated traffic-blocking gate arm is made of laminated resin layers formed in a tubular configuration having a generally rectangular cross-section.

6. The traffic control device defined in claim 1 wherein the actuating mechanism includes a crank arm anchored to the shaft and a reversible actuator pivotally joined by a first pivot pin to the crank arm and by a second pivot pin to a fixed base-support, whereby actuating movement of the actuator in a first direction rotates the crank arm and the shaft to raise the gate arm, and opposite movement of the actuator oppositely rotates the crank arm and the shaft to lower the gate arm.

7. The combination defined in claim 6 wherein the actuator is an extensible hydraulic piston-cylinder unit forming a support for a removable hydraulic assembly including a motor-driven pump, a hydraulic fluid reservoir and conduit means operatively connecting the pump, reservoir and cylinder, with both of said pivot pins being removable to facilitate removal and replacement of the motor, pump, reservoir, conduit means and their supporting hydraulic piston-cylinder unit.

8. A traffic control device positioned beside the path of approaching traffic and comprising in combination
(A) a rotatably-mounted shaft having its axis substantially parallel to the traffic path,
(B) gate-supporting means anchored to the shaft to rotate therewith,
(C) an elongated traffic-blocking gate arm extending in a plane transverse to the shaft's axis and the traffic path,
(D) means, joining the gate arm to the gate-supporting means, for releasing said gate arm from said gate supporting means when said gate arm is deflected from said plane,
(E) and an actuating mechanism
(1) connected to move the gate-supporting means pivotally about the shaft's axis to position the gate arm in one of two limiting positions and to move the gate arm to each of these positions upon command, and
(2) including a crank arm anchored to the shaft and a reversible actuator pivotally joined by a first pivot pin to the crank arm and by a second pivot pin to a fixed base-support, whereby actuating movement of the actuator in a first direction rotates the crank arm and the shaft to raise the gate arm, and opposite movement of the actuator oppositely rotates the crank arm and the shaft to lower the gate arm, said crank arm being positioned on said shaft to substantially equalize the actuating pressure throughout the movement of said actuator.

9. The traffic control device defined in claim 8 wherein the actuator is an extensible hydraulic piston-cylinder unit forming a support for a removable hydraulic assembly including a motor-driven pump, a hydraulic fluid reservoir and conduit means operatively connecting the pump, reservoir and cylinder, with both of said pivot pins being removable to facilitate removal and replacement of the motor, pump, reservoir, conduit means and their supporting hydraulic piston-cylinder unit.

10. The traffic control device defined in claim 8 wherein the elongated traffic-blocking gate arm is tubular with successively smaller-diameter segments having their adjacent ends joined in telescoping engagement, forming a unitary hollow gate arm having a central hollow bore extending along substantially its entire length.

References Cited

UNITED STATES PATENTS

| 1,356,302 | 10/1920 | Mills | 49—41 |
| 1,416,162 | 5/1922 | Black | 49—385 |
| 1,993,533 | 3/1935 | Staley | 49—334 X |
| 2,203,914 | 6/1940 | Logan | 49—334 X |
| 2,255,878 | 9/1941 | Dilley | 49—334 X |
| 2,550,399 | 4/1951 | Blake | 49—124 X |
| 2,701,856 | 2/1955 | Jefferson | 49—334 X |
| 2,874,493 | 2/1959 | Mandel | 49—334 X |

DAVID J. WILLIAMOWSKY, *Primary Examiner.*

D. L. TAYLOR, *Assistant Examiner.*